Jan. 9, 1951          C. C. MARTINELLI          2,537,597
SYSTEM FOR MEASURING THE CLOSING RATE OF AIRCRAFT
Filed Feb. 12, 1947          2 Sheets-Sheet 1
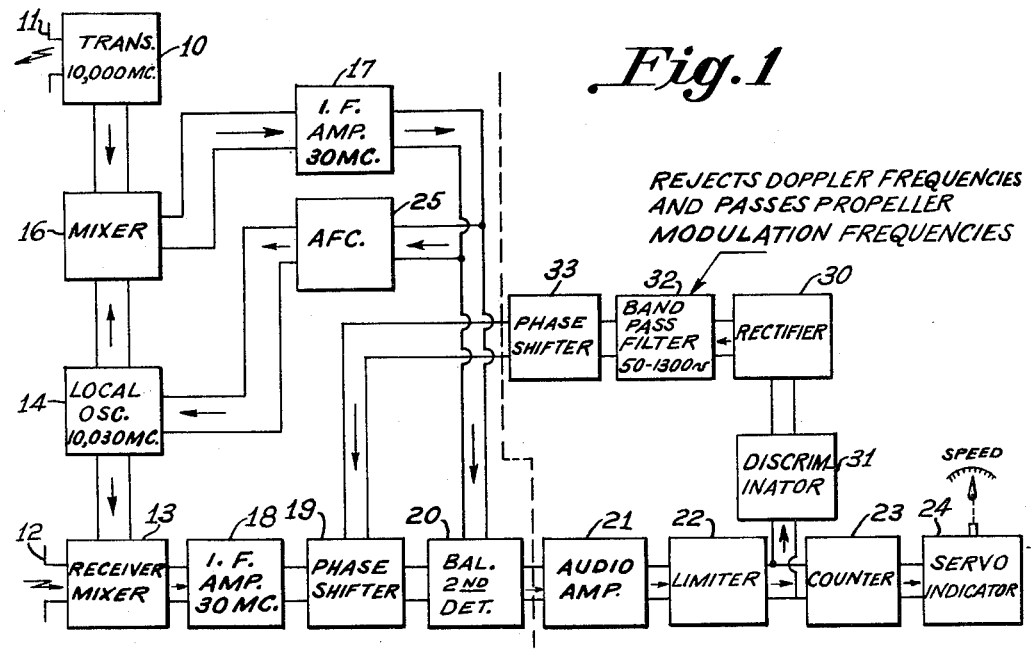
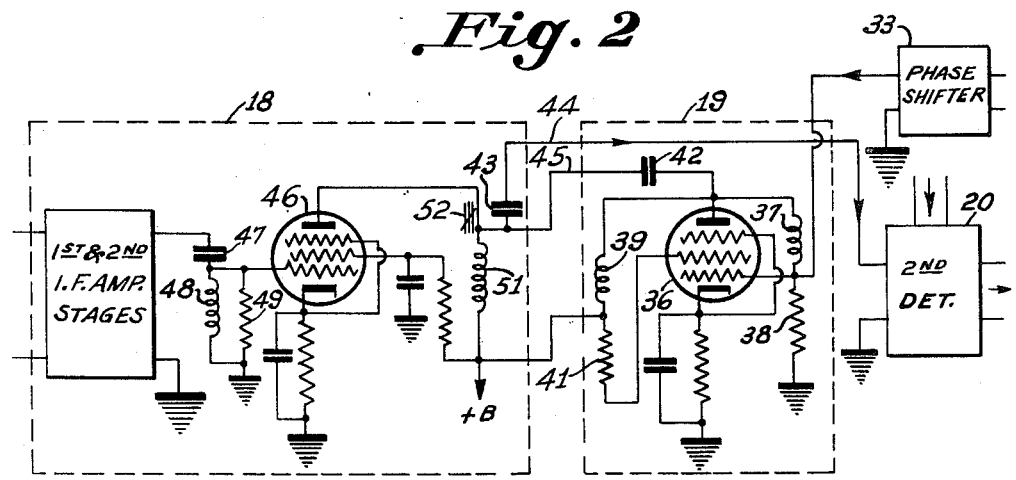
INVENTOR.
Ciro C. Martinelli
BY
ATTORNEY

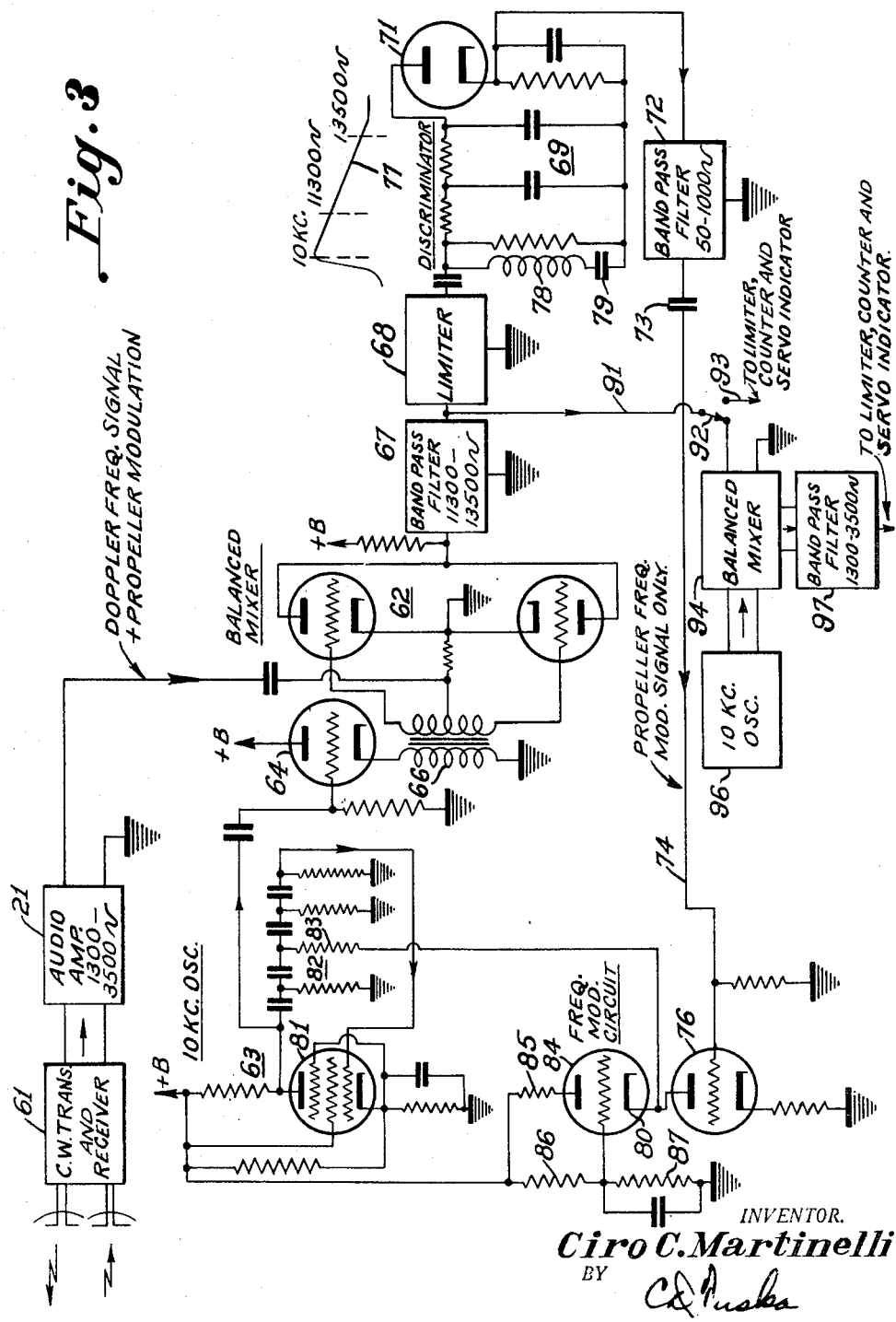

Patented Jan. 9, 1951

2,537,597

UNITED STATES PATENT OFFICE 2,537,597

SYSTEM FOR MEASURING THE CLOSING RATE OF AIRCRAFT

Ciro C. Martinelli, Princeton, N. J., assignor to Radio Corporation of America, a corporation of Delaware Application February 12, 1947, Serial No. 728,139

7 Claims. (Cl. 343—8)

1

My invention relates to radio apparatus that utilizes a reflected radio signal and the Doppler effect for determining relative speeds and particularly to apparatus for determining the speed of approach of an aircraft about to land. In designing such equipment it has been found that the presence of propeller modulation on the reflected signal makes it necessary to take special precautions in the equipment design if successful operation is to be obtained.

The specific apparatus described hereinafter is designed for aiding in the landing of aircraft on aircraft carriers where the relative speed of the aircraft and the carrier may be as low as 40 knots. Under these conditions the Doppler beat frequency will be as low as 200 cycles per second if the transmitted carrier frequency is of the order of 1500 megacycles per second, for example. Certain types of carrier type aircraft have four-bladed propellers and when making carrier approaches may have rotational speeds as high as 2500 R. P. M. with a resulting propeller modulation frequency of approximately 160 cycles per second.

It will be apparent that if the Doppler frequencies and the propeller modulation frequencies are so close together it is a problem to separate them over a range of Doppler frequencies. The problem is further complicated by the fact that the signal due to propeller modulation is not a definite fixed frequency but, instead may be represented by a carrier and side bands with all components fluctuating at a fairly fast rate. The signal may fluctuate from a condition where most of the energy is in one side band to one where most of the signal is in the other side band. Furthermore, the signal resulting from propeller modulation usually has considerable frequency modulation on it. While the amplitude is removed by amplitude limiting, the frequency modulation is not.

An object of the invention is to provide an improved method of and means for determining the speed of approach of an aircraft.

A further object of the invention is to provide an improved method of and means for determining the relative speed of an aircraft and an aircraft carrier.

A still further object of the invention is to provide in a relative speed determining system an improved method of and means for preventing propeller modulation currents from appearing in the output mixed with Doppler frequency currents.

A still further object of the invention is to provide an improved speed determining radio system of the type utilizing reflected radio waves.

In practicing the present invention first the problem of separating propeller modulation com-

2 ponents from the Doppler frequency signal is avoided by using a transmitter frequency that is high enough to produce a Doppler frequency considerably higher than the propeller modulation frequencies. In the present example, the transmitter operates in the X band at 10,000 megacycles per second. Then for a closing rate of 40 knots the Doppler frequency is 1350 cycles per second which is a frequency that may be separated from the propeller modulation frequencies without any difficulty. The propeller modulation frequencies fall within a band of from 50 to 1300 cycles per second.

Preferably, an unmodulated radio wave is transmitted from the aircraft carrier toward the approaching aircraft and the reflected signal is mixed at the receiver, which is of the superheterodyne type, with signal direct from the transmitter. The Doppler signal is then obtained by demodulating the signal thus mixed. The resulting demodulated signal contains not only the desired Doppler signal but also a group of signals produced by the rotating propeller of the aircraft as previously explained. This mixture of signals is amplified and passed through a limiter to a frequency counter which is connected to a suitable indicator such as a meter or a servo motor indicator circuit wherein the motor shaft assumes an angular position that is a function of the frequency measured by the counter.

The propeller modulation components are substantially eliminated so far as amplitude modulation is concerned by the amplitude limiter. According to the present invention, the components due to frequency modulation by the propeller are substantially eliminated by supplying some of the signal from the limiter to a frequency discriminator and supplying the resulting output to a band pass filter which passes the propeller modulation components and rejects the Doppler frequency component. These propeller modulation components are then applied to a phase shifter in the receiver channel so as to remove substantially all the propeller frequency modulation from the receiver output.

The invention will be better understood from the following description taken in connection with the accompanying drawing in which Figure 1 is a block diagram of one embodiment of the invention, Figure 2 is a circuit diagram of a portion of the system of Fig. 1, and Figure 3 is a block and circuit diagram of another embodiment of the invention. In the several figures similar parts are indicated by similar reference characters.

Figure 1 shows an embodiment of the invention comprising a radio transmitter 10 that supplies an unmodulated carrier wave to a directive antenna 11 from which the carrier wave is radiated toward the aircraft approaching for a landing. In the present example the carrier wave frequency is 10,000 megacycles per second. After reflection from the aircraft, the carrier wave is picked up by a receiving antenna 12 and supplied to a mixer or first detector 13 of a superheterodyne type receiver.

The local heterodyning signal is obtained from a local oscillator 14 operating at 10,030 mc. which differs from the transmitter frequency by an amount equal to the desired intermediate frequency which, in the present example, is 30 megacycles per second. Signal from the oscillator 14 and signal from the transmitter 10 are supplied to a mixer 16. The resulting mixer output includes the desired 30 mc. I.-F. signal which is supplied to an I.-F. amplifier 17. Signal from the local oscillator 14 is also supplied to the receiver mixer 13 where it mixes with the reflected signal of 10,000 mc. plus Doppler frequency, assuming the aircraft is approaching. The output of mixer 13 comprises the I.-F. carrier of 30 mc. plus Doppler frequency. This signal is amplified by an I.-F. amplifier 18 and supplied through a phase shifter circuit 19 to a second detector 20 where it beats with 30 mc. signal supplied from the I.-F. amplifier 17.

The above-described type of superheterodyne circuit (without the phase shifter) is described and claimed in copending application Serial No. 508,031, now Patent No. 2,424,796, issued July 29, 1947, filed October 28, 1943, in the name of Wendell L. Carlson and entitled Superheterodyne Radio Altimeter or Locator.

Preferably, an automatic frequency control or AFC circuit 25 is provided as described in the above-identified Carlson application for reducing the frequency band that must be passed by the I.-F. amplifiers. The local oscillator 14 may be a reflex Klystron that is frequency modulated by having the AFC circuit 25 vary the negative bias voltage on the reflector electrode of the Klystron.

The output of the detector 20 is the desired Doppler frequency signal which indicates the speed of the approaching aircraft but, in addition, the output would include the undesired propeller modulation signal as previously explained if not removed by the AFC and phase shifter circuit. This output is amplified by an audio frequency amplifier 21 which may be designed to pass a band of frequencies of from 1300 to 5000 cycles per second. Cut-off at the lower frequencies is desirable to reduce the effects of sea-return signals and cut-off at the higher frequencies is desirable to reduce noise signals.

The output of amplifier 21 is supplied through an amplitude limiter 22 to a frequency counter 23. The counter 23 may control a servo motor system 24 to drive a shaft 26 in one direction or the other as a function of the frequency of the signal supplied to the counter 23. Or the counter output may be supplied to a frequency meter that is calibrated in knots.

At the output of the limiter 22 the signal no longer contains amplitude modulation components but it does still contain the frequency modulation components, neglecting for the moment the action of the hereinafter described circuit AFC and phase shifter circuit in removing the latter components. Some of the output from the limiter 22 is supplied to a frequency discriminator 31 so that in the discriminator output after rectification by a rectifier 30 there appears the audio frequency signals corresponding to the propeller frequency modulation. These signals are then applied to a band-pass filter 32 which may have a pass band of from 50 cycles per second to 1300 cycles per second. It will be noted that all Doppler frequency signals including those of the lowest Doppler frequency, here assumed to be 1350 cycles per second, are rejected by the filter.

The frequency discriminator 31 should be of a type having a slope that is linear and that extends over a frequency range large enough to include the Doppler frequency and its accompanying side bands for the entire range of Doppler frequencies corresponding to the different speeds of the approaching aircrafts.

The propeller modulation output of the filter 32 is passed through a phase shifter 33 to the phase shifter 19. The phase shifter 33 is provided merely to compensate for phase shifts in the various circuit components so that the phase shifter action of the unit 19 is properly phased with the frequency variations in the incoming signal at the receiver 13.

The output from the phase shifter 33 when supplied to the phase shifter 19 shifts the phase of the I.-F. signal as a function of the propeller frequency modulation and in the direction or sense to remove such modulation. For instance, an instantaneous increase in the frequency of the received signal at antenna 12 results in a practically simultaneous phase shift which is substantially equivalent to a reduction in the frequency of the I.-F. signal applied to the second detector 20. This results in a like frequency change in the audio frequency output of the detector 20 so that the latter output is pulled back substantially to the desired frequency. No detailed description of the theory explaining how the phase modulation results in a frequency modulation effect is required as this is well understood in the art.

Figure 2 shows, merely by way of example, a phase shifter circuit of the reactance tube type that may be employed in the system of Fig. 1. The reactance tube circuit is of a well known type comprising a vacuum tube 36 that has a quadrature network comprising an inductance coil 37 and a resistor 38 connected between the anode of tube 36 and ground. The control grid of tube 36 is connected to the junction point of coil 37 and resistor 38. Operating voltage is applied from +B to the anode and screen grid of tube 36 through a choke coil 39 and a resistor 41, respectively.

The anode or reactance tube 36 is coupled through a capacitor 42 and a conductor 45 to the tuned anode circuit of the last I.-F. amplier stage so as to vary its tuning slightly and thereby vary the phase of the I.-F. signal supplied to the second detector 20. This signal is supplied to detector 20 through a coupling capacitor 43 and a conductor 44.

The I.-F. amplifier 18 is of conventional design. Each stage may be similar to the last stage which comprises an amplifier tube 46 that has its control grid coupled to the preceding stage by a coupling capacitor 47. Bias voltage is applied to the control grid through a choke coil 48 and a resistor 49 in parallel. The tuned output circuit comprises an inductance coil 51 that resonates with its distributed capacity and is tunable by means of a plug 52 of magnetic material.

Figure 3 shows an embodiment of the invention where the propeller modulation is removed by special circuit means in the audio frequency portion of the apparatus. The block 61 represents any suitable apparatus for obtaining a signal representative of the closing rate of an aircraft. In the present example the block 61 is assumed to include the superheterodyne system shown in Fig. 1 to the left of the broken line but with the phase shifter 19 omitted.

The output of the amplifier 21, which is the desired Doppler signal plus undesired frequency modulation, is supplied to a balanced mixer 62 where it beats with signal supplied from an oscillator 63 by way of a cathode follower tube 64 and a transformer 66. Assuming the oscillator 63 operates at 10 kilocycles per second and assuming signals from the amplifier 21 of from 1300 to 3500 cycles per second, the resulting upper side band signals are in the frequency range from 11,300 to 13,500 cycles per second.

The upper side band signals are passed through a band pass filter 67 and through an amplitude limiter 68 and a frequency discriminator 69 to a rectifier tube 71. The resulting output of the rectifier 71 is a signal corresponding to the frequency modulation caused by the aircraft propellers and may include components from 50 to 1000 cycles per second. This propeller modulation signal is passed through a band pass filter 72 and through a coupling capacitor 73 and a conductor 74 to the control grid of a vacuum tube 76. As will be described hereinafter, the signal applied to the grid of tube 76 frequency modulates the oscillator 63 in the direction to remove frequency modulation from the output signal of the mixer 62.

Referring more specifically to the frequency discriminator 69, it preferably is of a type that has a fairly long linear slope such as shown by the graph 77. The particular discriminator illustrated comprises a low pass filter of the resistor-capacitor type and a series tuned circuit 78, 79 connected across the R-C filter input. In the present instance the circuit 78, 79 series resonates at a frequency slightly below 10 k. c. to provide the sharp rise at the start of the graph 77. There are other suitable frequency discriminators that may be employed if preferred.

Referring now to the oscillator 63 and its frequency modulating circuit, this circuit is the same as shown in Patent No. 2,321,269 issued June 8, 1943 to Maurice Artzt and entitled Frequency Modulation. The oscillator 63 is a resistance-capacitor oscillator comprising a vacuum tube 81 and a delay network 82. The delay network 82 introduces a phase shift to cause oscillation at the frequency at which the phase shift in the network is 180 degrees. By varying the resistance of one or more resistors in the network 82, the frequency of oscillation may be changed. This variable resistor in the circuit illustrated comprises the resistor 83 and the anode-cathode impedance of the tube 76 in series. Thus, varying the impedance of tube 76 varies the frequency of the oscillator 63.

In order to avoid introducing a varying voltage into the oscillator circuit as the impedance of tube 76 is varied, a vacuum tube 84 is connected in series with the tube 76, the cathode 80 of tube 84 being connected to the anode of the tube 76. Operating voltage is applied through an anode resistor 85 to the anode of the tube 84. Voltage divider resistors 86 and 87 are connected in series between the +B supply and ground, and the grid of the tube 84 is connected to the junction point of these resistors.

In operation, if the grid of tube 76 is made more negative, the impedance of tube 76 increases thereby decreasing current flow through the serially connected tubes 76 and 84. This causes the cathode 80 to tend to become more positive with respect to the grid of tube 84 thereby increasing the impedance of tube 84. As a result there is practically no voltage variation at the anode of tube 76, the only variation being the very small amount necessary for the control action.

From the foregoing description it will be evident that by frequency modulating the oscillator 63 by the propeller frequency modulation signal, substantially all propeller modulation signal is removed from the output of the mixer 62. If, for example, the signal from the audio frequency amplifier 21 has a 60 cycle variation due to propeller modulation, there is a corresponding variation in the frequency of the signal applied to the discriminator 69 and the voltage output of the filter 72 varies in amplitude at this 60 cycle rate. The signal from filter 72, by varying the impedance of the tube 76, varies the frequency of the oscillator 63 at the 60 cycle rate, the frequency of oscillator 63 increasing when the frequency of the signal from the audio amplifier 21 increases whereby the frequency difference remains substantially constant.

The output of the band pass filter 67 may be supplied by way of a conductor 91, a switch 92 and a conductor 93 to a limiter, frequency counter and servo indicator or other suitable indicator (not shown). Preferably, however, the switch 92 is thrown to supply signal to a mixer 94 which may be like the mixer 62. Signal from a 10 k. c. oscillator 96 is supplied to the mixer 94 where it beats the Doppler signal down to its original frequency range of 1300 to 1500 cycles per second. This lower frequency is then passed through a band pass filter 97 to a limiter, frequency counter and suitable indicator (not shown).

I claim as my invention:

1. In a radio system for measuring relative speed by reflected radio waves, radio transmitter means for transmitting radio waves toward a reflecting object, radio receiver means for receiving said waves after reflection from said object, means for deriving from said received signal a signal that due to the Doppler effect may be utilized to indicate said relative speed and that is unavoidably frequency modulated, means for utilizing said derived signal for indicating said relative speed, a frequency discriminator through which some of said derived signal is passed to obtain audio frequency components corresponding to said unavoidable frequency modulation, and means for utilizing said last-mentioned components to the exclusion of Doppler effect components for removing said undesired frequency modulation from the derived signal that is utilized to indicate relative speed.

2. In a radio system for measuring the closing speed of an aircraft by reflected radio waves, radio transmitter means for transmitting radio waves toward said aircraft, radio receiver means for receiving said waves after reflection from said aircraft, means for deriving from said received signal a signal that due to the Doppler effect may be utilized to indicate said closing speed and that is unavoidably frequency modulated by the propeller of said aircraft, means for utilizing said derived signal for indicating said closing speed, a frequency discriminator through which some of said derived signal is passed to obtain audio frequency components corresponding to said propeller frequency modulation, and means for utilizing said last-mentioned components to the exclusion of Doppler effect components for removing propeller frequency modulation from the derived signal that is utilized to indicate relative speed.

3. In a radio system for measuring relative speed by reflected radio waves, radio transmitter means for transmitting radio waves toward a reflecting object, radio receiver means for receiving said waves after reflection from said object, means for deriving from said received signal a signal having a characteristic that is a function of said relative speed, said received signal having an undesired frequency modulation thereon which appears in said derived signal, a detector or mixer in the output circuit of which said derived signal appears, an indicator means, said derived signal being supplied to said indicator to indicate speed, a frequency discriminator to which a portion of said derived signal is supplied whereby an audio frequency signal corresponding to said frequency modulation is obtained, means for filtering the output of said discriminator to exclude the signal components representative of said relative speed and to pass only the frequency components corresponding to said frequency modulation, frequency control means for changing the frequency of the output signal of said detector or mixer, and means for applying the components passed by said filtering means to said frequency control means to change the frequency of said detector or mixer output signal in the direction to remove therefrom any variations in frequency due to said frequency modulation.

4. In a radio system for measuring relative speed by reflected radio waves, radio transmitter means for transmitting a radio wave toward a reflecting object, radio receiver means for receiving said waves after reflection from said object, means for mixing said received signal with signal derived from said transmitter for obtaining a signal that due to the Doppler effect may be utilized to indicate said relative speed and that is unavoidably frequency modulated, a mixer to which said last-mentioned signal is applied, an oscillator connected to apply signal to said mixer whereby a side band signal is obtained that is also unavoidably frequency modulated, means for utilizing the output of said mixer to indicate said relative speed, a frequency discriminator through which said side band signal of said mixer output is passed to obtain a control signal that corresponds to said frequency modulation, and means for frequency modulating said oscillator by said control signal in the direction to reduce the frequency modulation of the mixer output signal.

5. In a radio system for measuring the closing speed of an aircraft by reflected radio waves, radio transmitter means for transmitting a continuous radio wave toward said aircraft, radio receiver means for receiving said waves after reflection from said aircraft, means for mixing said received signal with signal derived from said transmitter for obtaining a Doppler frequency signal that is unavoidably frequency modulated by the propeller of said aircraft, a mixer to which said Doppler frequency signal is applied, an oscillator connected to apply signal to said mixer whereby a side band signal is obtained which also is frequency modulated by said propeller, means for utilizing the output of said mixer to indicate said closing speed, a frequency discriminator through which said side band signal of said mixer output is passed to obtain a control signal that corresponds to said frequency modulation, and means for frequency modulating said oscillator by said control signal in the direction to reduce the frequency modulation of the mixer output signal.

6. In a radio system for measuring relative speed by reflected radio waves, radio transmitter means for transmitting radio waves toward a reflecting object, radio receiver means for including a detector for receiving said waves after reflection from said object, a local oscillator connected to supply signal to said detector to produce an intermediate frequency signal output, a mixer to which signal from said oscillator and from said transmitter is applied to produce a second intermediate frequency signal, a second detector to which both of said intermediate frequencies are applied for producing an audio frequency signal that due to the Doppler effect may be utilized to indicate said relative speed and that is unavoidably frequency modulated, means for utilizing said derived signal for indicating said relative speed, a phase shifter connected to shift the phase of one of said intermediate frequency signals, a frequency discriminator through which some of said derived signal is passed to obtain audio frequency components corresponding to said frequency modulation, and means for applying to said phase shifter the last-mentioned components to the exclusion of Doppler effect components for removing propeller frequency modulation from the signal appearing in the second detector output circuit.

7. In a radio system for measuring the closing speed of an aircraft by reflected radio waves, radio transmitter means for transmitting radio waves toward said aircraft, radio receiver means for including a detector for receiving said waves after reflection from said aircraft, a local oscillator connected to supply signal to said detector to produce an intermediate frequency signal output, a mixer to which signal from said oscillator and from said transmitter is applied to produce a second intermediate frequency signal, a second detector to which both of said intermediate frequencies are applied for producing an audio frequency signal that due to the Doppler effect may be utilized to indicate said closing speed and that is unavoidably frequency modulated by the propeller of said aircraft, means for utilizing said derived signal for indicating said closing speed, a phase shifter connected to shift the phase of one of said intermediate frequency signals, a frequency discriminator through which some of said derived signal is passed to obtain audio frequency components corresponding to said propeller frequency modulation, and means for applying to said phase shifter the last-mentioned components to the exclusion of Doppler effect components for removing propeller frequency modulation from the signal appearing in the second detector output circuit.

CIRO C. MARTINELLI.

REFERENCES CITED

The following references are of record in the file of this patent:

UNITED STATES PATENTS

| Number | Name | Date |
| --- | --- | --- |
| 1,907,471 | Alexanderson | May 9, 1933 |
| 2,273,097 | Foster | Feb. 17, 1942 |
| 2,354,827 | Peterson | Aug. 1, 1944 |
| 2,394,544 | Gottier | Feb. 12, 1946 |
| 2,422,135 | Sanders | June 18, 1947 |
| 2,424,796 | Carlson | July 29, 1947 |